United States Patent [19]

Nambu

[11] Patent Number: 4,805,778
[45] Date of Patent: Feb. 21, 1989

[54] METHOD AND APPARATUS FOR THE MANIPULATION OF PRODUCTS

[75] Inventor: Yukio Nambu, Kameoka-shi, Japan

[73] Assignee: Nambu Electric Co., Ltd., Kyoto, Japan

[21] Appl. No.: 104,596

[22] Filed: Sep. 29, 1987

Related U.S. Application Data

[63] Continuation of Ser. No. 778,235, Sep. 20, 1985, abandoned.

[30] Foreign Application Priority Data

Sep. 21, 1984 [JP] Japan .................. 59-199167
Sep. 21, 1984 [JP] Japan .................. 59-199168

[51] Int. Cl.$^4$ .................. B07C 3/14; B07C 5/00; A01K 43/00
[52] U.S. Cl. .................. 209/3.3; 209/510; 209/549; 209/643; 209/701; 209/705; 209/938; 209/942
[58] Field of Search .................. 209/3.3, 510, 511, 546, 209/549, 643, 701, 702, 705, 936, 938, 939, 942

[56] References Cited

U.S. PATENT DOCUMENTS

| | | | |
|---|---|---|---|
| 2,766,879 | 10/1956 | Draper | 209/643 X |
| 3,503,501 | 3/1970 | Seaborn | 209/510 |
| 3,804,242 | 4/1974 | Tall et al. | 209/559 |
| 3,807,578 | 4/1974 | Nelson | 209/73 X |
| 4,051,952 | 10/1977 | Hauptmann et al. | 209/549 X |
| 4,184,598 | 1/1980 | Cowlin et al. | 209/705 |
| 4,236,640 | 12/1980 | Knight | 209/577 X |
| 4,253,649 | 3/1981 | Hewson | 209/45 |
| 4,281,765 | 8/1981 | Brazell et al. | 209/576 |
| 4,348,277 | 9/1982 | Cowlin et al. | 209/942 X |
| 4,351,437 | 9/1982 | Long | 209/936 X |
| 4,410,091 | 10/1983 | Cowlin et al. | 209/942 X |
| 4,487,321 | 12/1984 | Bliss | 209/510 |

*Primary Examiner*—Robert B. Reeves
*Assistant Examiner*—Edward M. Wacyra
*Attorney, Agent, or Firm*—Cushman, Darby & Cushman

[57] ABSTRACT

An apparatus for the manipulation of products, comprising a conveyor for conveying a plurality of products in a prescribed path, a locator for emitting light at the position of a specific product out of the plurality of products being conveyed in a detection zone on the path of the conveyor a video sensor and a microcomputer for receiving the light and, based on the received light, issuing a position coodinate signal indicating the position of the specific product in the detection zone, a conveyor speed detector for detecting the speed of the conveyor and issuing a travel speed signal corresponding to the speed, a microcomputer for issuing a current position coordinate signal indicating the position of the specific product in a separation zone of the conveyor situated downstream relative to the detection zone based on the position coordinate signal issued by the video sensor and microcomputer and the travel speed signal issued by the conveyor speed detector, and a removing device for giving necessary treatment to the specific product in the separation zone based on the current position coordinate signal.

24 Claims, 10 Drawing Sheets

| FIG. 5(a) |
| FIG. 5(b) |

FIG. 9 PROC 3

FIG. 8 PROC 2

FIG. 10

METHOD AND APPARATUS FOR THE MANIPULATION OF PRODUCTS

This is a continuation of application Ser. No. 778,235, filed Sept. 20, 1985, which was abandoned upon the filing hereof.

This invention relates to a method and apparatus for the manipulation of products.

In preparing hen's eggs for distribution to the market, the eggs collected from poultry farms are generally washed, dried, classified by weight, and packaged. During the course of this operation, bad eggs such as dirty eggs, cracked eggs, and bloody eggs are sorted out for due disposal. Where the detection of such bad eggs relies on a worker's eyesight and their manual ejection by the worker, the combination of the test by the eyesight and the manual ejection throws a serious hindrance to the recent trend of machinery toward increase of operational speed, and aggravates the decline of his work efficiency due to fatigue.

For improvement of operational efficiency, the bad eggs detected by the worker's eyesight are desired to be separated from good eggs with a special mechanism designed for saving labor. Means or devices for materializing this labor saving mechanism have been known to the art.

One such means is disclosed in Japanese Patent Application Laying Open No. 37460/84 corresponding to U.S. patent application Ser. No. 394,444 (dated July 1, 1982) now U.S. Pat. No. 4,487,321 titled "An article coding and separating system, an egg candler, a method of coding and separating articles, and a method of identifying a defective egg in an egg candler". This Patent discloses a method and apparatus for the separation of bad eggs from good eggs by the steps of detecting a bad egg out of an array of eggs by a worker's eyesight, causing display means rotatably supported on support means to be rotated in the direction of the detected bad egg and the leading end of the display means to be brought into contact with the bad egg, allowing the angular position so assumed by the display means to be translated in a corresponding signal thereby determining the position of the bad egg, and coding the bad egg based on the signal thereby permitting isolation of the bad egg from the rest of eggs. For the display means to recognize the position of the bad egg, the leading end of the display means is required to be brought into contact with the bad egg and the display means is therefore required to be freely extended or contracted each time the displayed position of a bad egg is changed. The operation of this apparatus, accordingly, necessitates much labor and skill on the part of the worker.

An object of this invention is to provide a method and apparatus for the sorting of eggs, which enables detection of a bad egg out of an array of eggs and determination of the position of the bad egg to be accurately and easily effected by a worker and allows manipulations such as removal and marking of the bad egg to be carried out with an automatic mechanism. This warrants an increase of operational speed and enhances operational efficiency.

In accordance with this invention, there is provided a method which comprises conveying a purality of products in a fixed direction along a prescribed path of conveyance, locating a light source directly above a specific product out of the aforementioned plurality of products being conveyed in a prescribed zone of the path of conveyance, causing the light source to issue a light momentarily, determining the position assumed by the specific product in the aforementioned prescribed zone at a specific point of time with the aid of the aforementioned light, calculating the current position of the aforementioned specific product on the path of conveyance based on the speed of conveyance of the specific product and the position determined in the aforementioned zone, and giving necessary treatment to the specific product at the current position.

Optionally, the calculation of the current position of the specific product in the prescribed zone of the path of conveyance may be effected by using a device adapted to rotate freely within a fixed plane above the path of conveyance, detect the angle formed between a specific position fixed near the path of conveyance and the specific product, and determine the current position of the specific product or a device adapted to slide freely on the path of conveyance, detect the distance of the specific product from a specific position fixed near the path of conveyance, and determine the current position of the specific product instread of utilizing the light issued at the current position of the specific product.

The aforementioned treatment consists in removing the specific product from the path of conveyance or applying a mark to the specific product.

Now, the present invention will be described specifically below with reference to the accompanying drawings which illustrate an embodiment thereof in the selection of a bad egg out of a plurality of eggs.

With reference to FIG. 1, 1a denotes a conveyor for causing a multiplicity of eggs 2a mounted thereon for the purpose of test to be advanced as rotated about their axes. The conveyor 1a used herein may be any of the conventional conveyors. Thus, the specific construction of this conveyor is obvious and requires no further description. By 3 is denoted a conveyor drive means and by 4 is denoted a conveyor speed detector as a second signal device.

Figure 1:
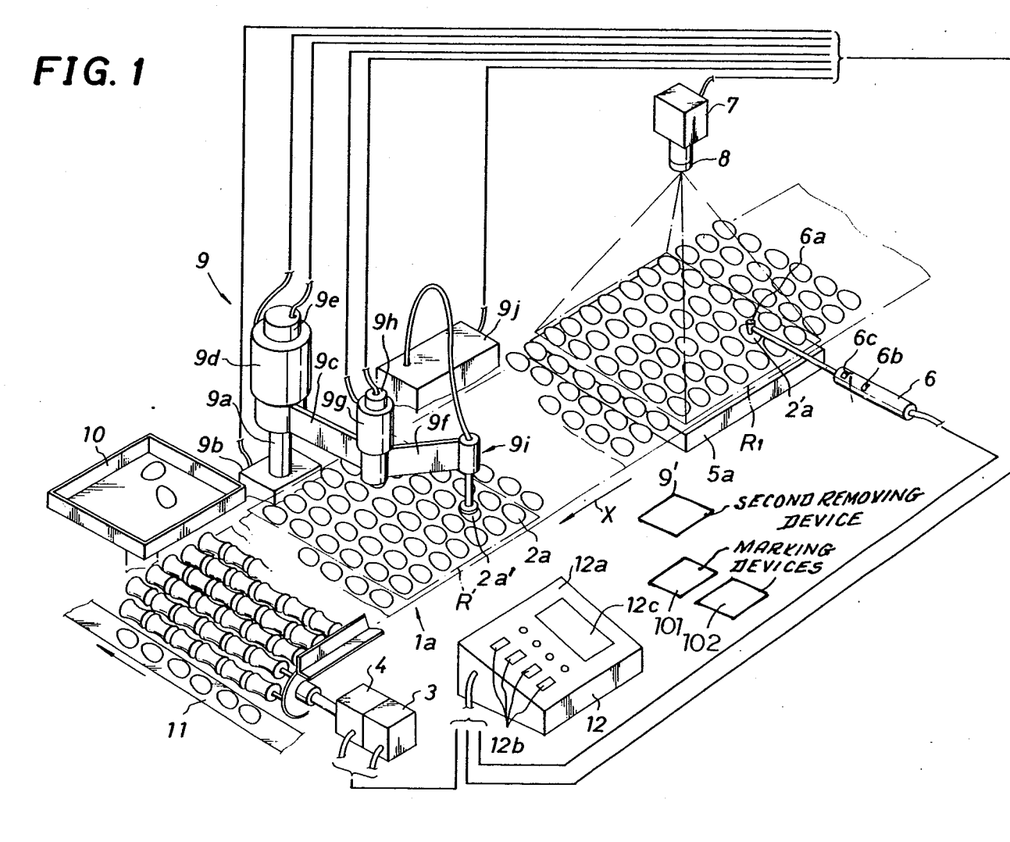
FIG. 1 is a perspective view schematically depicting the construction of an apparatus, an embodiment of this invention, for receiving a light issued from a bad egg and calculating the position of the bad egg.

On the conveyor 1a, the eggs 2a are mounted as arrayed in a matrix (rows and files). When a fixed detection zone $R_1$ is assumed as a first zone on the conveyor 1a, the positions of the individual eggs falling within this zone $R_1$ at a given time t can be defined by rectangular cartesian coordinates.

An illuminating device 5a disposed below the detection zone R₁ of the conveyor 1a illuminates at least the eggs falling within the detection zone R₁ upwardly. Thus, a worker is enabled to examine the illuminated eggs by eyesight and detect a bad egg, if any.

Denoted by 6 is a bad egg locator in the form of a light emitting device. The bad egg locator 6 is manually operated by the worker in such a manner that a light emitting unit 6a at the leading end thereof may be positioned directly above a bad egg 2a' within the detection zone R₁ of the conveyor 1a and a switch 6b may be turned on to cause emission of light. The light thus issuing from the light emitting unit 6a has a wavelength different from the wavelength of the light from the illuminating device 5a to ensure easy discrimination. Since the light from the illuminating device 5a normally embraces the whole range of wavelengths of the visible light, the light from the light emitting unit 6a of the bad egg locator 6 is desired to have wavelengths of invisible light such as, for example, an infrared ray. If the light from the illuminating device 5a has a specific wavelength (or a specific range of wavelengths), the light source of the light emitting unit 6a may be a visible light of a different wavelength (or a different range of wavelengths). A detection display device 6c serves to display the fact that the position of the bad egg indicated by means of the light issuing from the light source 6a is recognized by a microcomputer 20 which will be described more fully afterward.

Switches which serve to recognize the physical nature of the defect are not shown.

A video sensor 7 constitutes a first signal generating device in conjunction with part of the microcomputer 20 and possesses a field of vision corresponding at least to the aforementioned detection zone R₁ on the conveyor 1a. A filter 8 disposed at the inlet of the video sensor for admitting an incident light serves to pass only a portion of light of a specific wavelength out of the light from the light source 6a of the bad egg locator 6. By causing the light emitting unit 6a of the bad egg locator 6 positioned directly above the visually detected bad egg 2a' to emit light, therefore, the coordinates ($x_a$ and $y_b$) indicating the position of the bad egg 2a' in the detection zone R₁ at the time t can be specified based on the detection signal issued from the video sensor 7.

A bad egg removing device 9 is disposed along one edge of the conveyor 1a downstream in the direction of travel X of the conveyor 1a relative to the detection zone R₁. This bad egg removing device 9 comprises a main shaft 9a, an elevating mechanism 9b, a horizontal base arm 9c rotatably attached to the main shaft 9a, rotary means 9d for rotating the base arm 9c relative to the main shaft 9a, a first rotational angle detector 9e disposed as interlocked with the rotary means 9d, a horizontal leading arm 9f connected to the leading end of the base arm 9c rotatably relative to the base arm 9c, rotary means 9g for rotating the leading arm 9f relative to the base arm 9c, a second rotational angle detector 9h disposed as interlocked with the rotary means 9g and adapted to detect the rotational angle of the leading arm 9f relative to the base arm 9c, an egg suction device 9i disposed at the leading end of the leading arm 9f, and a vacuum pump 9j for feeding a vacuum to the egg suction device 9i.

A second bad egg removing device 9' is shown in FIG. 1 in block form, it being understood to be similar to device 9. Rather than removing the bad egg, it may simply be marked by one of marking devices 101 or 102, shown as blocks in FIG. 1

When a bad egg separation zone R' as a second zone is assumed as selected downstream in the direction of travel of the conveyor 1a relative to the detection zone R₁, the bad egg 2a' existing at the position of the coordinates ($x_a$ and $y_b$) within the detection zone R₁ at the aforementioned time t reaches the corresponding coordinates ($x'_a$ and $y'_b$) in the bad egg separation zone R' at the time t' after elapse of a duration corresponding to the speed of travel of the conveyor from the aforementioned time t.

The bad egg removing device 9 as means of manipulation is constructed and disposed in such a manner that the egg suction device 9j thereof may be positioned freely anywhere within the separation zone R'. By causing the egg suction device 9i to move and reach the coordinates ($x'_a$ and $y'_b$) of the position within the aforementioned zone R' while the bad egg is in motion between the aforementioned times, t and t', the bad egg can be suctioned at the position and removed from the conveyor 1a.

A receiving plate 10 serves to receive the bad egg removed from the conveyor as described above and a conveyor 11 serves to receive good eggs from the conveyor 1a and transfer them to the subsequent step.

A control unit 12 embraces a control circuit including a microcomputer which will be described more fully afterward. On a control panel 12a are set up various operating switches 12b and displays 12c.

Figure 2A:
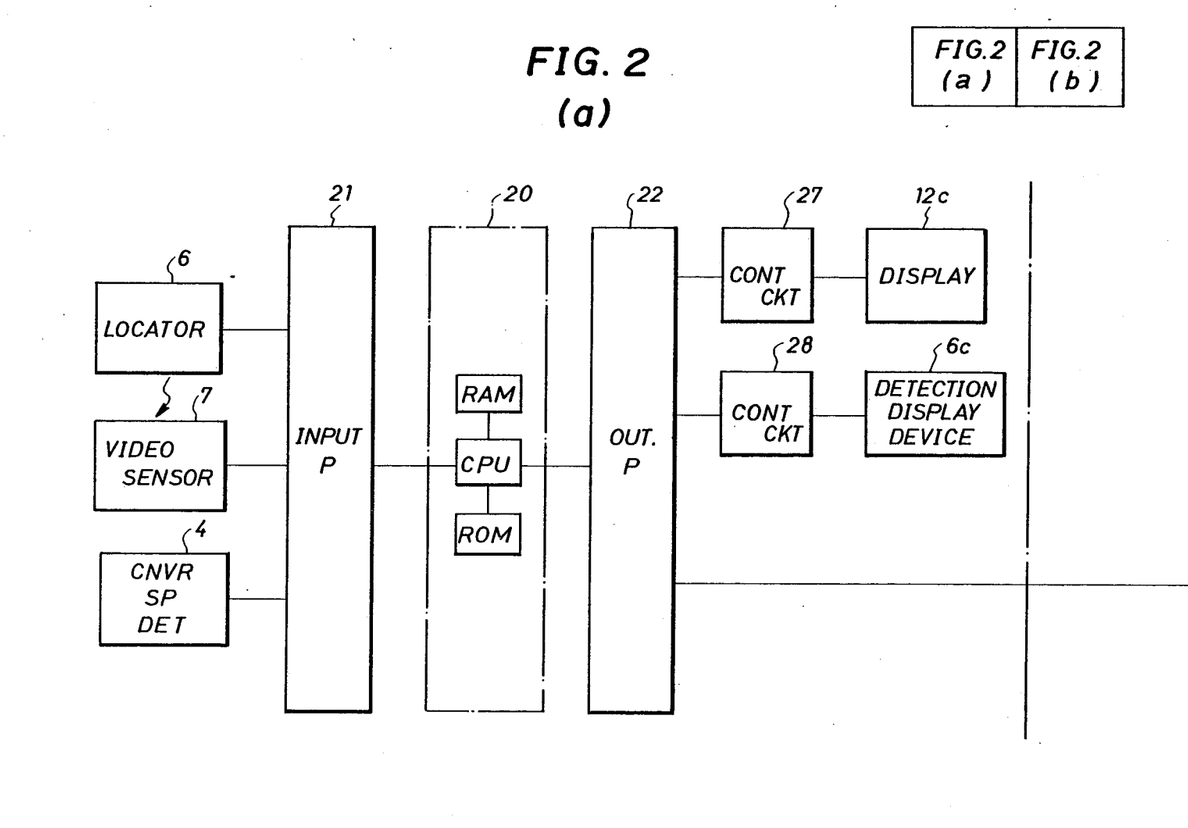
FIGS. 2A and 2B show respectively two halves of a block diagram of a control circuit for the aforementioned apparatus.
Figure 2B:
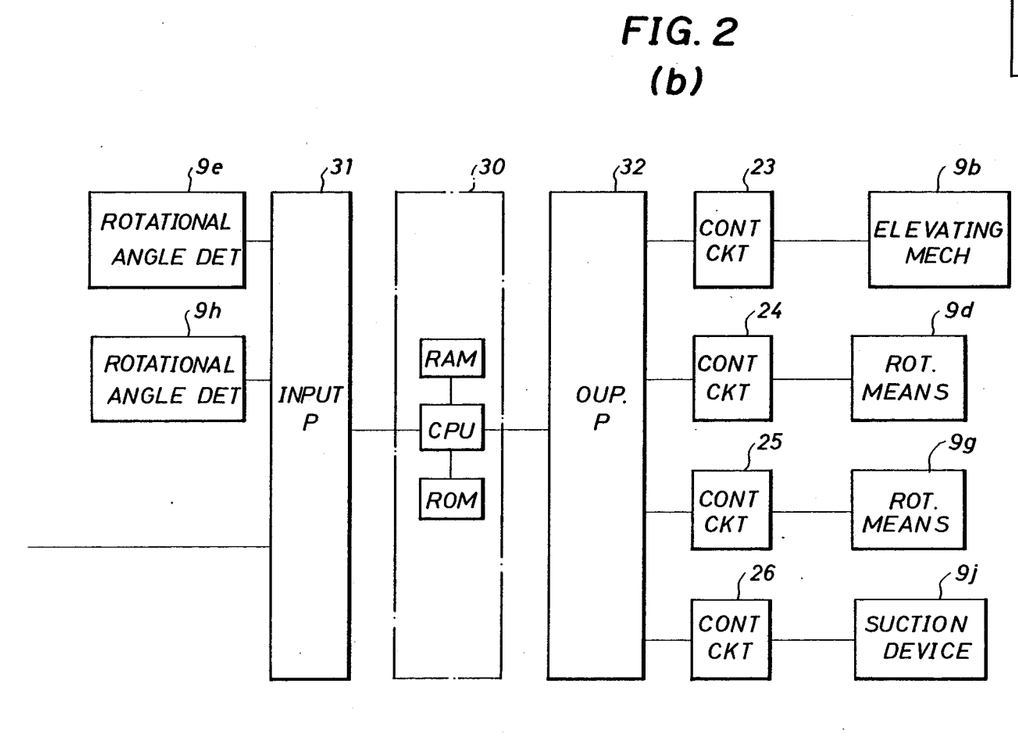

FIG. 2 is a block diagram of the control circuit incorporated in the control unit 12. In the diagram, the reference symbols which have equivalents in FIG. 1 denote identical components. In the diagram, 20 denotes a microcomputer composed of CPU, RAM, and ROM and which is adapted to issue positional signals, 21 an input port thereof, 22 an output port thereof, 30 a microcomputer composed of CPU, RAM, and ROM and adapted to control the bad egg removing device 9, 31 an input port thereof, and 32 an output port thereof.

Now, the operation of the apparatus of FIG. 1 constructed as described above will be explained.

With reference to FIG. 1 and FIG. 2, the worker holding the bad egg locator 6 in hand keeps his eyes on the eggs on the conveyor 1a within the detection zone R₁ with the aid of the light emanating from the illuminating device 5a. On detecting a bad egg, he places the light source 6a directly above the bad egg and depresses the switch 6b to cause momentary emission of light from the light source 6a. In response to the signal issued from the switch 6b, the video sensor 7 displays its recognition of the signal, i.e. detecting the light from the light source 6a and feeding a corresponding signal to the microcomputer 20. In accordance with this signal of detection, the microcomputer 20 reads out the coordinates of the position of the light source 6a (bad egg) within the detection zone R₁ at that moment and generates a corresponding position coordinate signal as the first signal.

During the travel of the conveyor 1a, the conveyor speed detector 4 keeps detecting the travelling speed of the conveyor 1a (eggs) and feeds a corresponding travel speed signal as a second signal to the microcomputer 20. The microcomputer 20 constantly corrects the position coordinate signal issued by the aforementioned video sensor 7 during its sensing operation based on the aforementioned travel speed signal, issues a current position coordinate signal as a third signal corresponding to the coordinates of the current position of the bad egg 2a', and transfers this third signal to the control microcomputer 30 of the bad egg removing device 6.

The control microcomputer 30, in accordance with the aforementioned current position coordinate signal and the angular signals from the rotational angle detectors 9e, 9h, feeds to control circuits 23, 24, 25, and 26 the control signals for moving the egg suction device 9i of the bad egg removing device to the coordinates of the current position of the aforementioned bad egg indicated by the current position coordinate signal, lowering the suction device and causing it to generate a suction, then lifting the suction device, allowing the sucked egg to be transferred onto the receiving plate 10, and causing the suction device to cease a suction, with the result that the elevating mechanism 9b of the main shaft 9a, the rotary mechanism 9d of the base arm 9c, the rotary mechanism 9g of the leading arm 9f, and the vacuum pump 9 will be operated in a prescribed sequence.

The microcomputer 20 takes count of the number of generation of operation signals (number of bad eggs) issued by the switch 6b of the bad egg locator 6, feeds a corresponding count signal to the control circuit 27 of the display 12c to be displayed thereon and, at the samed time, feeds a response signal indicative of recognition of the position coordinate signal on the bad egg to the control circuit 28 to be displayed on the display 6c of the bad egg locator 6.

Now, the computer processing of the operations of detection and removal of a bad egg will be described in detail below.

Figure 5:
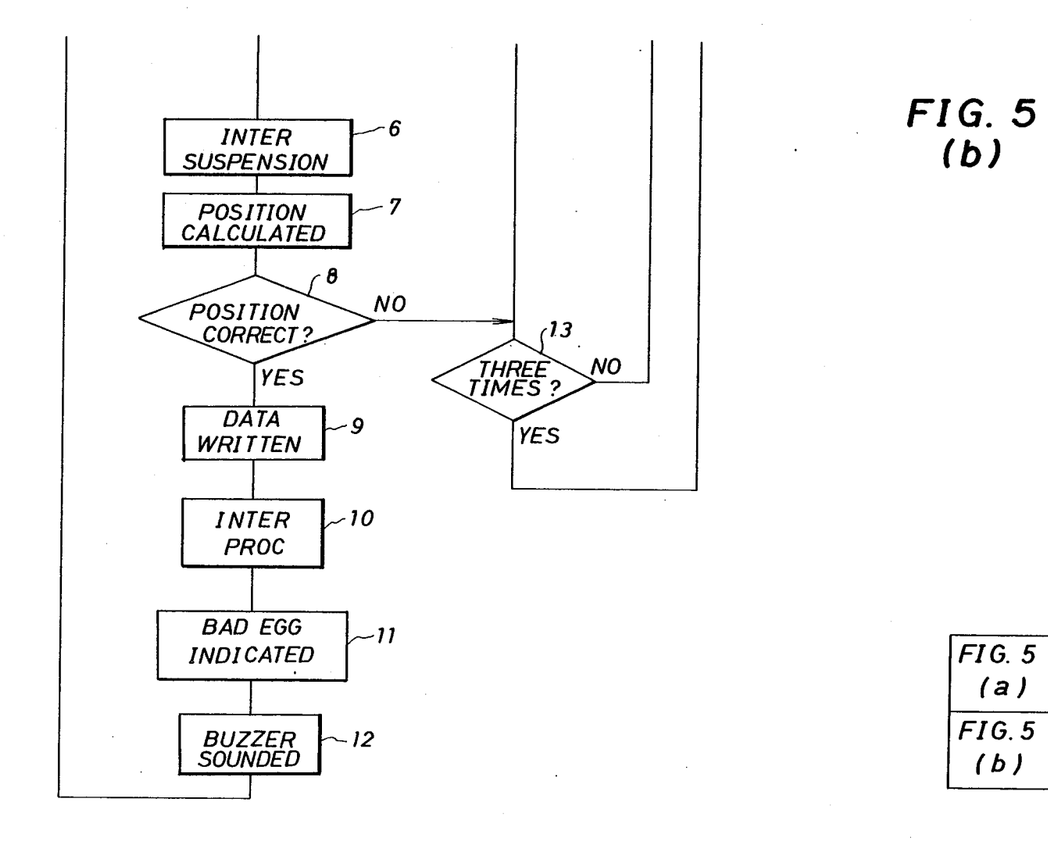
FIG. 5A and 5B show a flow chart used by the microcomputer to perform the egg processing.
Figure 5A:
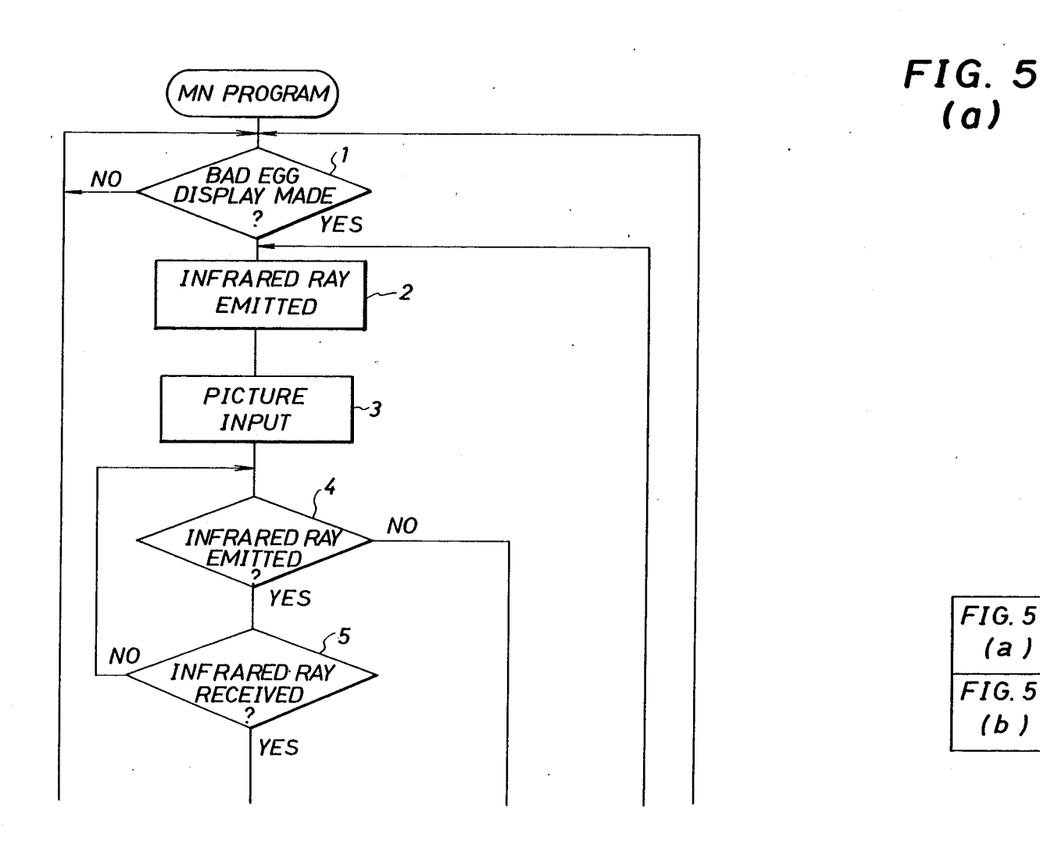
Figure 6:
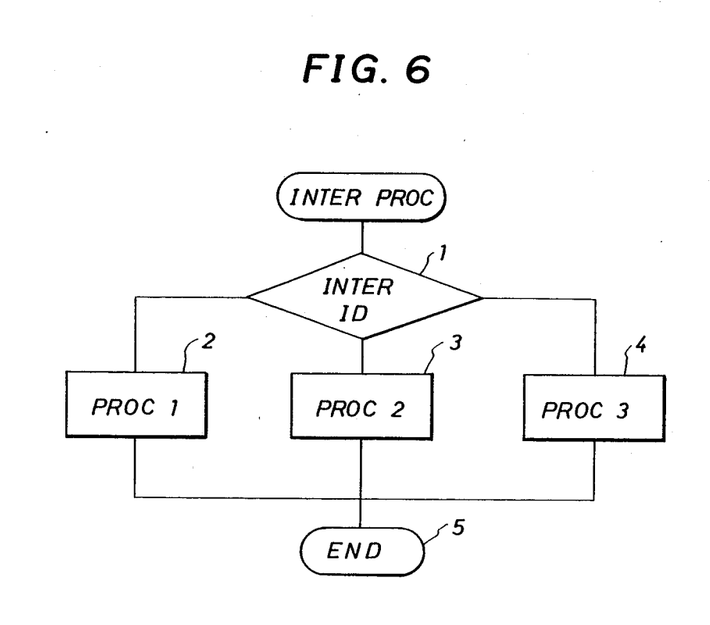
FIG. 6 shows the interrupt processing.

The procedure for effecting detection and removal of a bad egg by the operation of the apparatus of this invention comprises the two flows of steps illustrated in FIG. 5 and FIG. 6. The main program comprises instructions which keeps on admitting successive arrays of eggs being introduced for the purpose of selection of bad from good eggs and, at the same time, seeking to locate a bad egg among the incoming eggs in response to interruptions with timer and clock signals.

The main program will be described on the basis of the flow chart of FIG. 5.

As the operation of the program is started, the program forms a judgment as to whether or not display of a bad egg has been made by a bad egg locator 6 (step 1). When the judgment decides on an absence of the display of a bad egg, the program continues to await display of a bad egg through successive interruptions with clock signals. When the judgment decides on presence of the display of a bad egg, an infra red LED 6a of the bad egg locator 6 is turned on for a period of 40 ms (step 2). A CCD camera or a video sensor 7 receives the light thus emitted from the infrared LED and, in response, feeds out a signal for reading in the image of the light (step 3). The reading of the image is carried out in an external circuit (not shown). After the reading of the image is started, the program effects judgment on termination of the emission of the light from the infrared LED (step 4). This judgment on the termination of the emission of light from the infrared LED relies on a confirmation of the elapse of 40 ms after the LED is turned on. The program exercises judgment as to whether or not the CCD camera receives the light from the infrared LED during the interval of 40 ms (step 5). When the CCD camera receives no light from the infrared LED, i.e. when the infrared LED issues no light, the control in the step 13 exercise judgment as to whether or not the number of occasions of the absence of light reception has totalled 3. When this number is 3 or less, the program is returned to the step 2, there to turn on the infrared LED and allow the CCD camera to receive the light from the infrared LED. If the CCD camera fails to receive the light from the infrared LED even after the infrared LED is turned on three times in a row, the display of a bad egg is nullified (step 13).

When the CCD camera has received the light from the infrared LED, the program temporarily suspends (step 6) the introduction of an interruption signal until the data on bad egg is written in a shift buffer (step 9).

The position of the infrared LED captured by the CCD camera, i.e. the position in the specified bad egg detection zone is calculated based on the number of horizontal scanning lines and that of vertical scanning lines (step 7).

This calculation of the position is carried out as follows.

The CCD camera forms a discernible image with resolvability of 491 dots in the vertical direction and 398 dots in the horizontal line. In the resolvability in the vertical direction, since interlaces are diverted as non-interlace signals, however, the number of horizontal scanning lines usable for the recognition of position in the vertical direction is about 240 dots.

If 24 files of eggs arranged in the direction of conveyor travel fall in the field of vision of the CCD camera, 10 horizontal scanning lines can be allotted to each of the files. The resolvability in the horizontal direction immediately equals the resolvability of the CCD element used in the CCD camera. After 340 out of the aforementioned total of 398 dots are used for the discernment of the image.

Figure 10:
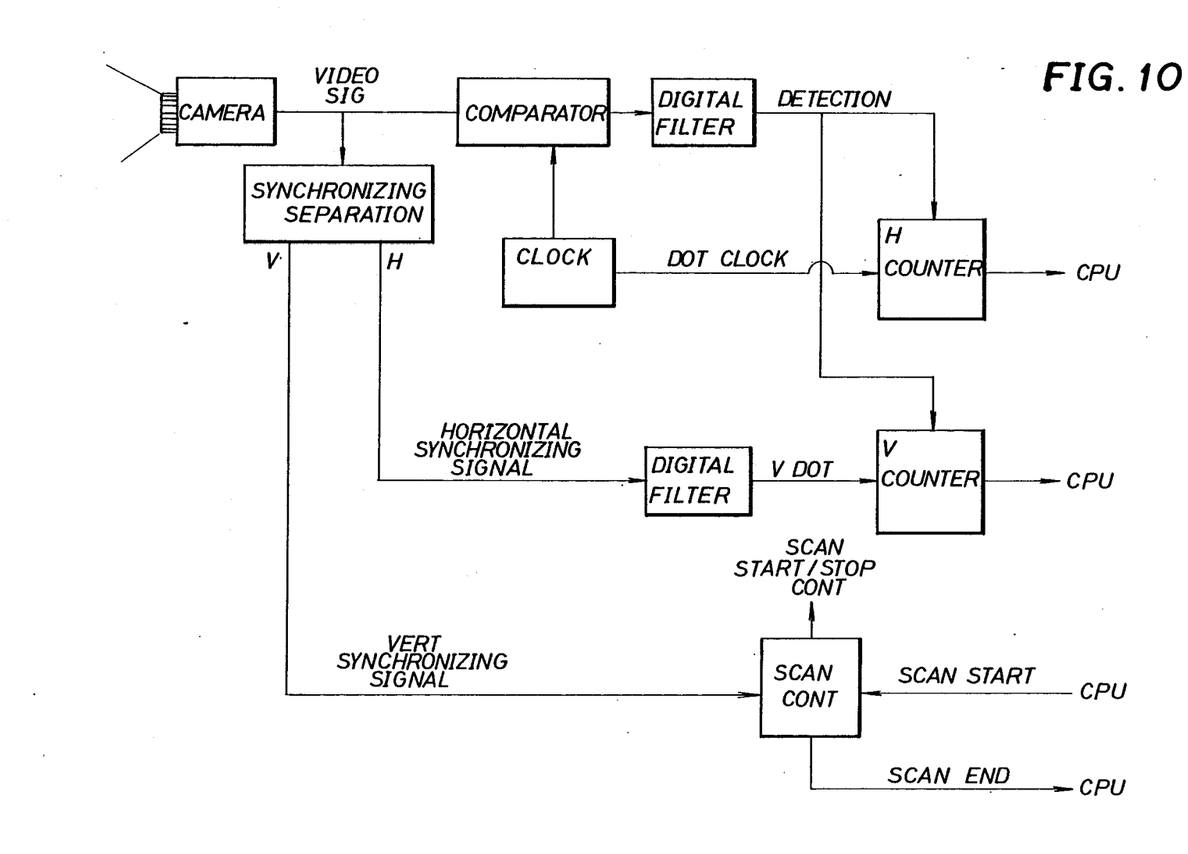
FIG. 10 shows a block diagram of the entire operation.

In FIG. 10, when the CPU of a computer 20 issues a signal for starting the scanning of the camera image, the counters for the horizontal direction and the vertical direction, by taking cue of the subsequent vertical synchronizing signal, immediately start counting the numbers of dots in the horizontal direction and the vertical direction.

When light is issued at the position of a bad egg, the position of the origin of this light in the camera image is determined by the dots which represent points of intersection between the horizontal and vertical lines forming the camera image. The CPU, by calculation based on the data of dots, finds the relative location of the bad egg given by the ordinal numbers of the specific file and row in the array of eggs on the conveyor.

The CPU continues to follow the current position of the bad egg on the conveyor, in accordance with the data which comprise a clock 1, i.e. a signal issued by a conveyor speed detector 4 each time the conveyor moves past one of the rollers advancing the conveyor, and a clock 3, i.e. a signal of a total of 200 pulses to be fed out before the next clock 1 is issued.

The relative positions of all the eggs arranged in a matrix appearing in the field of vision of the camera are memorized in the CPU. The CPU, on receiving the data of dots issued from the display in response to the camera image, immediately converts the data of dots into data of relative positions on the conveyor. The, the CPU examines the position so calculated to determine whether or not it is identical with the actual position of the bad egg (step 8). When this examination yields a negative result, the display is nullified and the program is returned to the status awaiting display of a bad egg (step 1). When the examination yields an affirmative result, the position of the detected bad egg is committed to memory. Then, the data so obtained are written in the buffer of the CPU by depression of a switch (not shown in FIG. 1) which serves to confirm the physical nature of the defect of the bad egg in question (step 9).

The program is enabled to process interruptions by releasing the temporary suspension of issuance of interruption signal (step 10). The program, then, confirms and displays the signal which the worker turns on based on the kind of bad egg indicated by the three LED's, E1 through E3 (not shown) attached to the display (step 11). When the display is confirmed, the buzzer is sounded briefly by way of indication of normality of the display (step 12). Then, the program is returned again to the status awaiting display of a bad egg.

Now, the program for the processing of an interruption will be described with reference to the flow chart of FIG. 6.

When an interruption signal is injected from an external source while the main program is in progress, the processing of interruption is started in accordance with the kind of the external interruption signal. This interruption is prohibited during the interval between the step 6 and the step 10.

When the external interruption signal is received, the program examines this signal and discerns its kind (step 1) and, depending on the result of this discernment, starts the processings 1, 2 and 3. On completion of this processing of interruption, the main program is resumed (step 5). The external interruption signals are classified under three groups respectively for the processings 1, 2 and 3.

The processing 1 (FIG. 7) is selected for signals injected at intervals of 10 ms to 15 ms by the timer.

Figure 7:
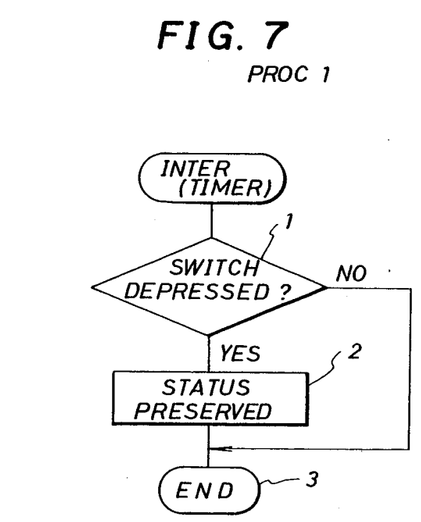
FIG. 7 shows the processing 1 interrupt.

In the processing 1, the push buttons, E1 through E3, disposed on the display unit are kept under constant watch to determine whether or not they are depressed or not (step 1). When absence of such depression is confirmed, the processing 1 is brought to completion (step 3). When presence of such depression is detected, this status is preserved as data for judgment in the step 1 of the main program (step 2). Thereafter, the processing is terminated (step 3).

The processing 2 (FIG. 8) is selected for the clock 1 (the signal injected from the conveyor speed detector 4 each time the conveyor 1a moves past each of the rollers for advancing the conveyor).

Figure 8:
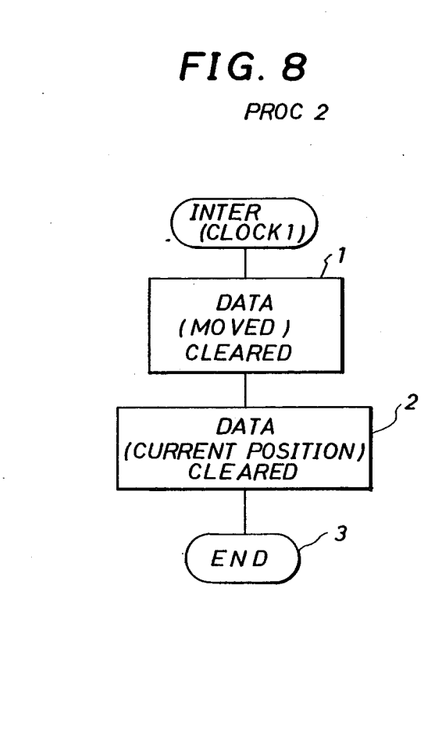
FIG. 8 shows the processing 2 interrupt routine.

The clock 1 concurrently serves as a reference for starting the operation and as a signal for determining the first position. When this signal is injected, the data on the quantity of eggs being moved between adjacent rollers are cleared (step 1). Then the signal indicating the coordinates of the current position of the bad egg issued to a computer 30 of the unit for removal is cleared (step 2) and the processing is brought to completion (step 3).

The processing 3 (FIG. 9) is selected for the clock 3 (the signal of 200 pulses issued in the interval between two adjacent rollers).

Figure 9:
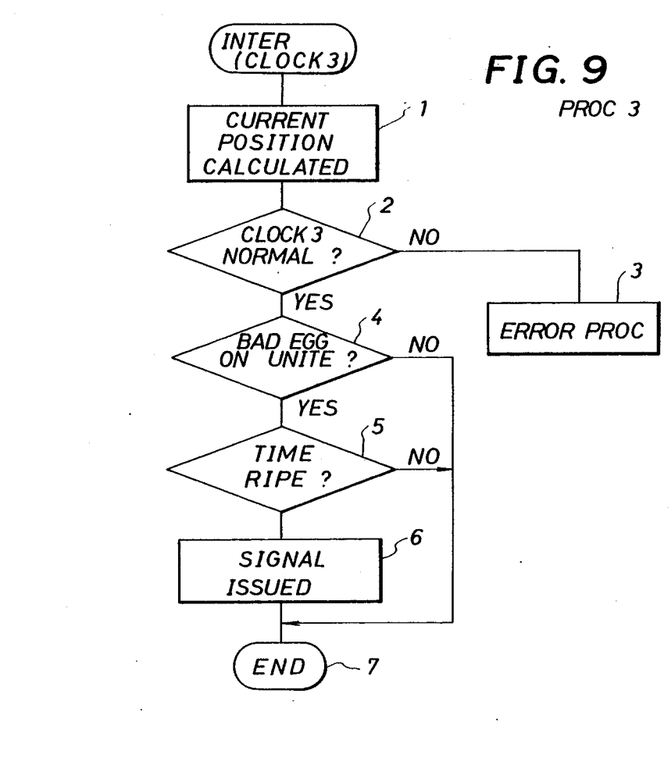
FIG. 9 shows the processing 3 interrupt routine.

The clock 3 is mainly used for calculating the amount of travel which the egg makes between the standard positions of rollers (which are determined by the clock 1). When this signal is injected, the program calculates the distance by which the current position of the bad egg is separated from the standard position (step 1).

Then, the program examines the clock 3 to determine whether or not this clock 3 has been injected correctly (whether or not a total of 200 pulses have been fed out between two adjacent clocks 1) (step 3). The clock 3 is abnormal when the current position of the egg has not been perceived correctly.

When the clock 3 is found normal, the program begins the processing for forwarding the signal indicating the coordinates of the current position of the bad egg to a computer 30 for the unit of removal. First, the program checks the bad egg to determine whether or not it is correctly positioned on the unit for removal (step 4). When no bad egg is found on the unit for removal, the processing is brought to termination (step 7). When the bad egg is found correctly on the unit for removal, the program exmines the position to determine whether or not the time is ripe for issuing a signal (step 5). (The position of the unit for removal from the conveyor is fixed in advance and the position of the bad egg on the conveyor is calculated as a deviation from the reference value by the CPU. Thus, the CPU is enabled to judge as to whether or not the bad egg has reached the unit for removal. When the bad egg has reached the unit for removal, the CPU issues the signal indicating the coordinates of the current position of the bad egg to the computer of the unit for removal and enables the unit for removal to repel the bad egg. When the bad egg has not reached the unit for removal, the CPU refrains from issuing this signal.) When the time is ripe for issuing the signal indicating the coordinates of the current position of the bad egg, the program issues this signal to the computer 30 of the unit for removal (step 6). Then, the processing 3 is brought to completion and the main program is resumed.

The computer for position signal repeats the foregoing processings on the eggs in each of the six files on the conveyor.

The microcomputer 30, on receiving the signal indicating the coordinates of the current position from the computer 20 for position signal, converts the received signal into an angular signal indicating the position for removal of the bad egg. After this conversion, the CPU of the control computer calculates angles of rotation to be fed to rotary angle detectors, 9e, 9h in response to the coordinates indicating the current position of the bad egg and issues signals indicative of the angles of rotation to the two detectors. After the egg suction device 9i has reached the coordinates of the current position of the bad egg, the CPU, based on the signal just mentioned coupled with the signal indicating the coordinates of the current position, issues to control circuits 23, 24, 25 and 26 the control signals for effecting descent, suction, ascent, and transfer to the receiving plate 10, by suitably actuating the elevation mechanism 9b, the rotation mechanisms 9d, 9g, and the suction device 9j.

After the bad egg has been transferred onto the receiving plate 10, control signals for releasing suction are forwarded to the control circuits 23, 24, 25 and 26 to operate the aforementioned elevation mechanism 9b, the rotation mechanisms 9d, 9g, and the suction device 9j in a prescribed sequence.

Figure 3:
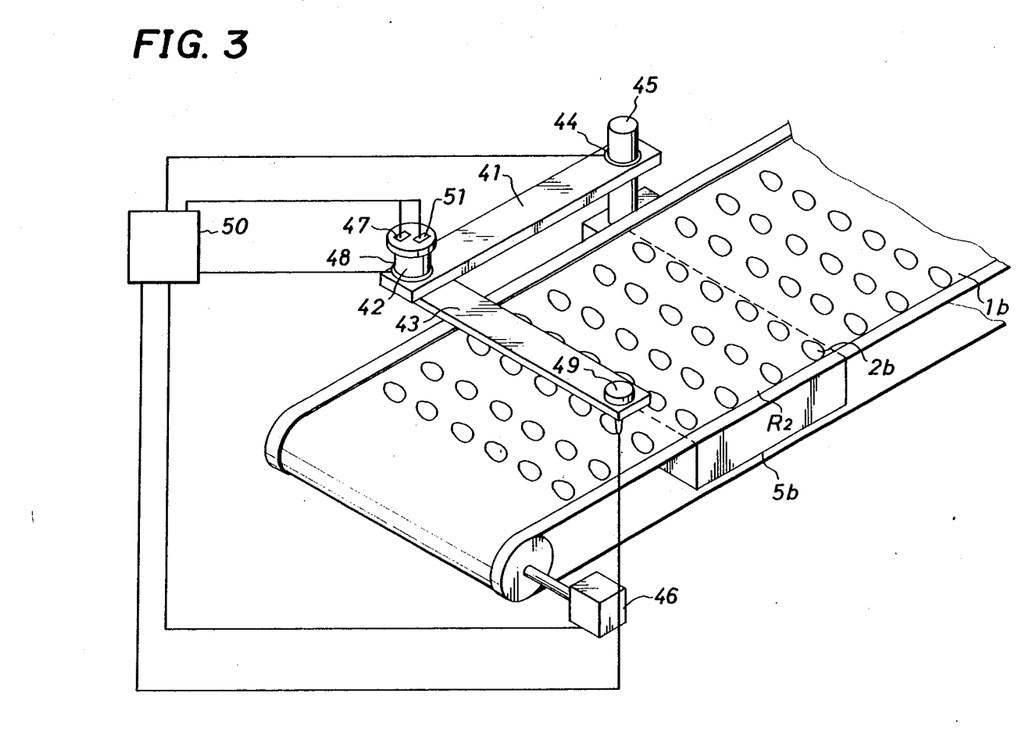
FIG. 3 is a perspective view schematically depicting the construction of an apparatus for detecting the angle of the bad egg relative to a specific position and calculating the position of the bad egg.
Figure 4:
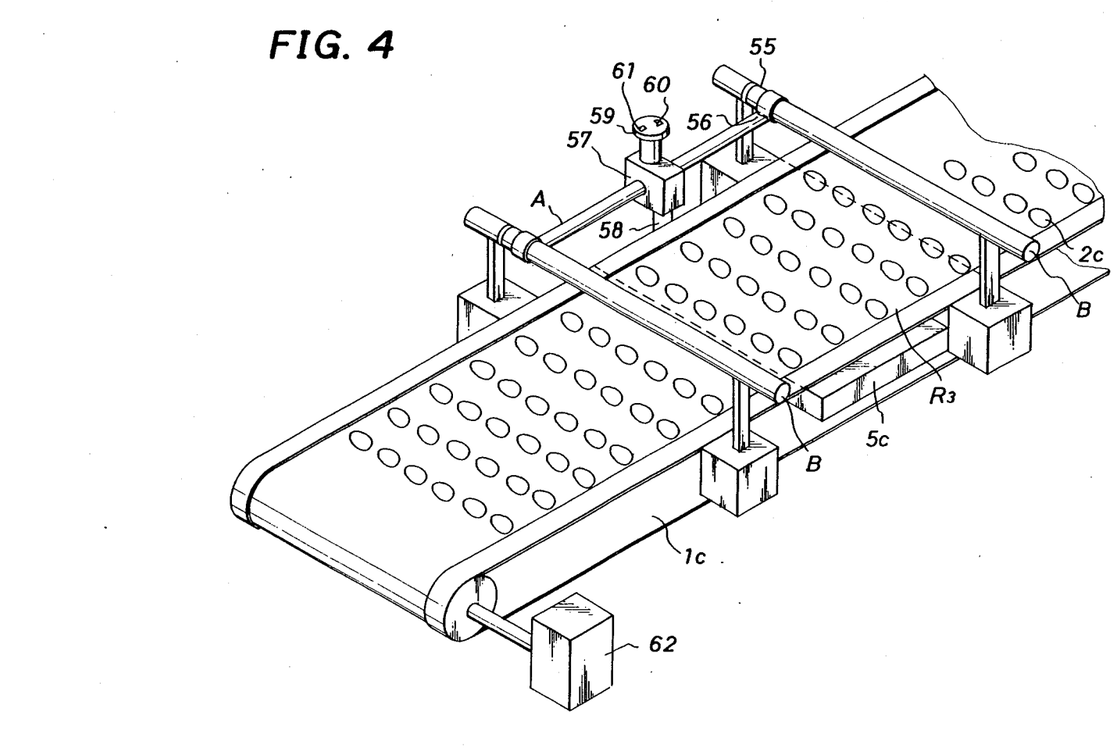
FIG. 4 is a perspective view schematically depicting the construction of an apparatus for detecting the distance of the bad egg from a specific position and calculating the position of the bad egg.

After the apparatuses illustrated in FIG. 3 and FIG. 4 have detected angles and distances of the bad egg in the detection zone relative to the specific position and calculated the position of the bad egg. The procedure for the calculation of the coordinates of the current position by the use of the computer is the same as that of the apparatus of FIG. 1.

With reference to FIG. 3, a conveyor 1b causes a multiplicity of eggs 2b mounted therefor for the purpose of test to be advanced as rotated about their axes.

By 46 is denoted a conveyor travel speed detector as a speed detector. The drive means for the conveyor is not shown in the diagram.

In the diagram, $R_2$ denotes a detection zone on the conveyor $1b$, and $5b$ denotes an illuminating device disposed below the detection zone $R_2$ of the conveyor $1b$, and 41 denotes a first arm disposed freely rotatably in a plane on the path of conveyance about a first shaft 45 as the center. The first shaft 45 is provided with a first angle detector 44 for detecting the angle of the first arm 41 relative to the first shaft 45.

The first arm 41 is provided at the leading end thereof with a second shaft 42 disposed parallelly to the first shaft 45. A second arm 43 is disposed rotatably in a plane on the path of conveyance about the second shaft 42 as the center. The second arm 43 is provided at the leading end thereof with an indication control device 49 for issuing an indication signal identifying a bad egg.

The angle formed by the first arm 41 and the second arm 43 is detected by a second angle detecting device 48 disposed on the second shaft 42. Switches 47, 51 serve to recognize physical nature of defect.

An arithmetic device 50 serves to calculate the coordinates of the specified product (bad egg) in accordance with the angle detected by the first and second angle detectors and the signals from the indication control device and the conveyor travel speed detector and issues a current position signal of the specific product.

Now, the operation of the apparatus of FIG. 3 constructed as described above will be explained below. With reference to FIG. 3, the worker keeps his eyes on the eggs being conveyed on the conveyor $1b$ as rotated about their axes with the aid of the light from the illuminating device $5b$ from below the conveyor $1b$ in the detection zone $R_2$. On detecting a bad egg, he operates the holder 52 so as to place the indication control device 49 directly above the bad egg. At this time, the switches 47, 51 are used for the discrimination of a bad egg and the indication control device 49 is used for designating the position of the bad egg and issuing a first indication signal. At the same time that this signal is issued, the arithmetic device 50 is enabled to detect the coordinates of the position of the bad egg in the detection zone $R_2$ based on the second signal issued by the first angle detector 44 serving to detect the angle of the first arm 41 relative to the first shaft 45 and the third signal issued by the second angle detector 48 serving to detect the angle formed between the first arm 41 and the second arm 43. Then, the arithmetic device 50 is allowed to issue a corresponding position coordinate signal. Further, the arithmetic device 50 constantly corrects the position coordinate signal based on the signal from the conveyor travel speed detector 46 corresponding to the travel speed of the bad egg on the conveyor $1b$ and issues a current position coordinate signal as a fifth signal corresponding to the coordinates of the current position of the bad egg. The specified bad egg is removed after its departure from the detection zone $R_2$. This removal of the bad egg may be effected with a removal device specially disposed outside the detection zone $R_2$ (not shown). Otherwise, all the bad eggs detected as described above may be collectively disposed on in a device adapted to sort the eggs in accordance with signals issued from the arithmetic device to a weighing device.

With reference to FIG. 4, $1c$ denotes a conveyor, $R_3$ a detection zone, $2c$ eggs for test, $6a$ for a conveyor speed detector, and $5c$ an illuminating device. Within the boundaries of the detection zone $R_3$ of the conveyor, first stationary shafts B are laid across the path of conveyance and a second shaft A is disposed slidably on the first shafts B. The second shaft A is provided thereon with a freely slidable control part 57. This control part 57 is provided with switches 60, 61 for discerning physical nature of defect, a holder 59, and a control unit 58 adapted to indicate a bad egg and issue a corresponding indication signal. The shaft A is provided at one end thereof with a first distance detector 56 for detecting the distance of motion of the control unit 58 in the axial direction of the shaft A. The shafts B are provided each at one end thereof with a second distance detector 55 for detecting the distance of motion of the control unit 58 in the axial direction of the shafts B.

Now, the operation of the apparatus of FIG. 4 constructed as described above will be explained.

With reference to FIG. 4 the worker keeps his eyes on the eggs $2c$ being conveyed as rotated about their axes on the conveyor $1c$ within the detection zone $R_3$. On detecting a bad egg, the worker operates the control device 58 directly above the bad egg, depresses a switch (either 60 or 61) corresponding to the nature of defect suffered by the bad egg, and enables the control device 58 to issue a first indication signal. Then the arithmetic device (not shown) determines the coordinates of the position of the bad egg in the detection zone $R_3$ based on the second signal issued by the first distance detector 56 disposed on the shafts A, the third signal issued by the distance detector 55 disposed on the shafts B, and the aforementioned indication signal and issues a corresponding position coordinate signal. At the same time, the arithmetic device constantly corrects the position coordinate signal based on the signal from the conveyor speed detector 62 and issues a current position coordinate signal as a fifth signal corresponding to the coordinates of the current position of the bad egg. The bag egg is removed on departure from the detection zone. This removal of the bad egg can be effected by the same device as illustrated in FIG. 1 (not shown in FIG. 4).

The illustrated embodiments of this invention have been described. Of course, this invention is not limited to the examples cited but may be practised otherwise without departing from the spirit of the invention disclosed herein. For example, while use of one bad egg removing device is illustrated, a plurality of such devices may be disposed. The specific construction of the removing device is not limited to that which is illustrated. The bad egg removing device may be adapted so that bad eggs may be divided into dirty eggs and cracked eggs, counted separately, and collected in two different receiving plates. For this purpose, the bad egg locator 6 illustrated in FIG. 1 may be provided with two indication switches.

Optionally, a marker adapted to put a mark to a bad egg may be used in the place of the bad egg removing device. In this case, different marks, i.e. marks of different shapes and/or different colors, may be put on dirty eggs and cracked eggs to facilitate discrimination. Of course, a plurality of such markers may be used. Instead of using just one locator, two or more such locators may be incorporated to be operated by both hands of the workers's or by a plurality of workers.

In the place of the locator illustrated in FIG. 1, a video sensor may be adopted to effect automatic discrimination of bad eggs in degree of dirtiness, size, and shape. Optionally, the discrimination of bad eggs may be accomplished by the combination of the judgment relying on the worker's eyesight and the automatic evaluation relying on the video sensor.

This invention can be applied as effectively to products other than eggs.

As described above, this invention permits discrimination of specific products out of a multiplicity of products to be carried out by a simple manual work and sorting works such as removal and marking to be carried out automatically. Thus, this invention contributes to increasing both operational speed and operational efficiency. In the case of the apparatus illustrated in FIG. 1, since the discrimination of specific products relies on the light and the video sensor, the bad egg locator enjoys implicity of handling and freedom of movement. This bad egg locator can be stowed in a place incapable of interfering with the shop operation and, therefore, proves highly advantageous from the operational point of view.

In the case of the apparatuses of FIG. 3 and FIG. 4, the bad egg locator and the control device warrant ease of handling.

What is claimed is:

1. An apparatus for manipulation of products, comprising:
    conveying means for conveying a plurality of products along a path which includes a first zone, and a second zone downstream of said first zone;
    a light emitting assembly comprising a manual gripping portion which is freely movable to any position, a rod connected at one end to one end of said manual gripping portion and light emitting means, attached to the other end of said rod, for emitting light at a position of a specific product among said plurality of products in said first zone of said path, said other end of said rod also being freely movable to any position, said manual gripping portion being provided with (a) a switch to be manually operated to command light to be emitted from said light emitting means and (b) detection indicating means for providing a perceivable indication of a recognition of said position of said specific product indicated by means of said light issued from said light emitting means, based on a response signal supplied thereto;
    first signal generating means, comprising a video sensor, for imaging said first zone to receive the light from said first zone and for issuing a first signal indicating a first position of said specific product in said first zone based on said received light;
    second signal generating means for detecting a speed of said conveying means and issuing a second signal indicative of said speed;
    third signal generating means for recognizing said first position of said specific product in said first zone based on said first signal from said first signal generating means, and for producing a third signal indicating a second position of said specific product in said second zone of said conveying means based on said recognized position of said specific product in said first zone and said second signal issued by said second signal generating means, and for producing said response signal and supplying said response signal to said detection indicating means to thereby indicate on said detection indicating means that said first position of said specific product in said first zone has been recognized; and
    manipulating means for treating said specific product in said second zone based on said third signal.

2. The apparatus according to claim 1, wherein the apparatus further comprises illuminating means disposed below said conveying means in said first zone for upwardly illuminating said products conveyed into the first zone with a light of a specific wavelength, to enable finding the specific product, said specific wavelength being a different wavelength from that of said light issued from the light emitting means, said video sensor being provided with a filter at an inlet thereof which passes a light with the same wavelength as that of the light issued from the light emitting means and does not pass a light with said specific wavelength.

3. The apparatus according to claim 1, wherein said manipulating means comprises means for removing said specific product from said path.

4. The apparatus according to claim 3, wherein said manipulating means comprises a plurality of devices for removing said specific product from said path.

5. The apparatus according to claim 1, wherein said manipulating means comprises means for placing a mark on said specific product.

6. The apparatus according to claim 5, wherein said manipulating means comprises a plurality of devices, each for placing a mark on said specific product.

7. The apparatus according to claim 1, wherein said light from said light emitting means is infrared.

8. The apparatus according to claim 1, wherein said conveying means comprises a conveyor for advancing said plurality of products while rotating said products.

9. The apparatus according to claim 1, wherein said manipulating means comprises a plurality of devices for removing said specific product from said path.

10. The apparatus according to claim 9, wherein said plurality of devices for removing said specific product from said path each comprises a suction unit and a vacuum pump.

11. The apparatus according to claim 1, wherein said manipulating means comprises a plurality of devices for placing a mark on said specific product.

12. An apparatus for manipulation of products, comprising:
    conveying means for conveying a plurality of products along a path which includes a first zone and a second zone downstream of said first zone;
    illuminating means disposed below said conveying means in said first zone, for upwardly illuminating said products conveyed into the first zone with a light of a specific wavelength to enable finding a specific product;
    a light emitting assembly comprising light emitting means for emitting light having a different wavelength from said specific wavelength, at a first position of a specific product among said plurality of products in said first zone of said path, and detection indicating means for providing a perceivable indication of recognition of said position of said specific product as indicated by said light issued from said light emitting means based on a response signal supplied thereto;
    first signal generating means comprising a video sensor for imaging said first zone, and a filter disposed at an inlet of said video sensor for passing light having said different wavelength, and not passing light having said specific wavelength, said video sensor receiving light passed through said filter to issue a first signal indicating said first position of said specific product in said first zone based on said received light;

second signal generating means for detecting a speed of said conveying means and issuing a second signal indicative of said speed;

third signal generating means for recognizing said first position of said specific product in said first zone based on said first signal issued by said first signal generating means, and for producing a third signal indicating a second position of said specific product in said second zone of said conveying means based on said recognized position of said specific product in said first zone and said second signal issued by said second signal generating means, and for producing said response signal and supplying said response signal to said detection indicating means to thereby indicate a recognition of the position of said specific product in said first zone on said detection indicating means; and manipulating means for treating said specific product in said second zone based on said third signal.

13. The apparatus according to claim 12, wherein said manipulating means comprises means for removing said specific product from said path.

14. The apparatus according to claim 13, wherein said manipulating means comprises a plurality of devices for removing said specific product from said path.

15. The apparatus according to claim 12, wherein said manipulating means comprises means for placing a mark on said specific product.

16. The apparatus according to claim 15, wherein said manipulating means comprises a plurality of devices for placing a mark on said specific product.

17. The apparatus according to claim 12, wherein said light from said light emitting means is an infrared ray.

18. The apparatus according to claim 12, wherein said conveying means comprises a conveyor capable of advancing said plurality of products while rotating said products.

19. The apparatus according to claim 12, wherein said manipulating means comprises a plurality of devices for removing said specific product from said path.

20. The apparatus according to claim 19, wherein said plurality of devices for removing said specific product from said path each comprises a suction unit and a vacuum pump.

21. The apparatus according to claim 12, wherein said manipulating means comprises a plurality of devices for placing a mark on said specific product.

22. An apparatus for recognizing a position of a product, comprising:

conveying means for conveying a plurality of products along a path which includes a first zone and a second zone downstream of said first zone;

a light emitting assembly comprising a manual gripping portion which is freely movable to any position, a rod connected at one end to one end of said manual gripping portion, and light emitting means, attached to the other end of said rod, for emitting light at a position of a specific product among said plurality of products in said first zone of said path, the other end of said rod also being freely movable to any position, said gripping portion being provided with a switch which is manually operated for commanding said light emitting means to emit light and with detection indicating means for providing a perceivable indication of recognition of said position of said specific product indicated by the light emitting means based on a response signal supplied thereto;

first signal generating means, comprising a video sensor, for imaging said first zone to receive the light from said first zone and for issuing a first signal indicating the position of said specific product in said first zone based on said received light;

second signal generating means for detecting a speed of said conveying means and issuing a second signal indicative of said speed; and third signal generating means for recognizing said position of said specific product in said first zone based on said first signal issued by said first signal generating means, and for producing a third signal indicating a second position of said specific product in said second zone of said conveying means based on said recognized position of said specific product in said first zone and said second signal issued by said second signal generating means, and for producing said response signal and supplying said response signal to said detection indicating means to thereby indicate the recognition of the position of said specific product in said first zone on said detection indicating means.

23. The apparatus according to claim 22, wherein the apparatus further comprises:

illuminating means disposed below said conveying means in said first zone for upwardly illuminating said product conveyed into the first zone with a light of a specific wavelength to enable to finding said specific product, said specific wavelength being different from a wavelength of said light from the light emitting means;

filter means, at an inlet of said video sensor, for passing a light of said wavelength of light issued from the light emitting means, and not passing light with said specific wavelength.

24. An apparatus for identifying a position of a specific product comprising:

conveying means for conveying a plurality of products along a path which includes a first zone and a second zone downstream of said first zone;

illuminating means disposed below said conveying means in said first zone for upwardly illuminating said products conveyed into the first zone with light of a specific wavelength to enable finding a specific product;

a light emitting assembly comprising light emitting means for emitting light, having a different wavelength than said specific wavelength, at a position of said specific product among said plurality of products in said first zone of said path, and detection indication means for providing a perceivable indication of recognition of said position of said specific product indicated by light from the light emitting means, based on a response signal supplied thereto;

first signal generating means, comprising a video sensor for imaging said first zone and a filter at an inlet of said video sensor, to pass light having said different wavelength and not pass light having said specific wavelength, said video sensor receiving light which passes through the filter to issue a first signal indicating the position of said specific product in said first zone based on said received light;

second signal generating means for detecting a speed of said conveying means and issuing a second signal indicative of said speed; and third signal generating means for recognizing said position of said specific product in said first zone based on said first signal issued by said first signal generating means, and for producing a third signal indicating a second position of said specific product in said second zone of said conveying means based on said recognized position of said specific product in said first zone and said second signal issued by said second signal generating means, and for producing said response signal and supplying said response signal to said detection indication means to thereby indicate the recognition of the position of said specific product in said first zone on said detection indication means.

* * * * *